Figure 1:
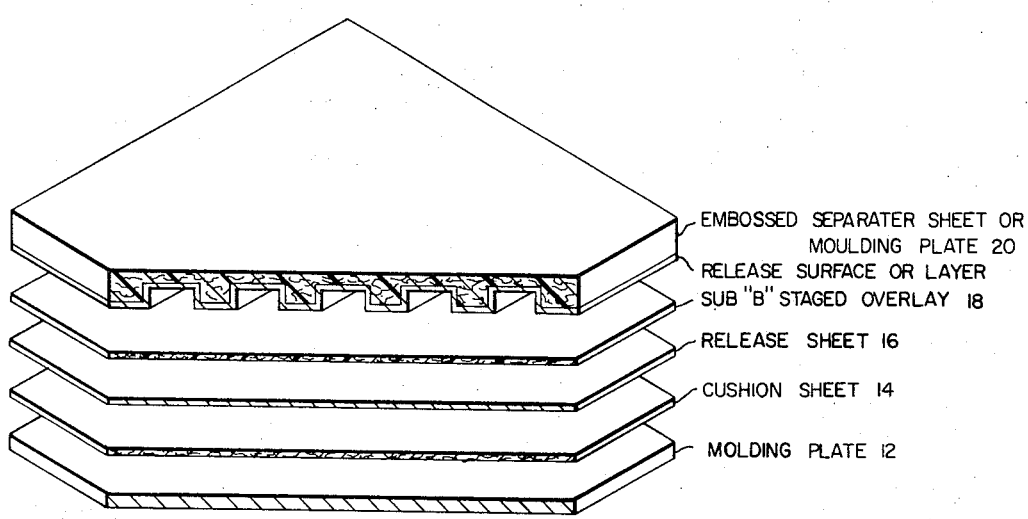

United States Patent [19]
McQuade, Jr.

[11] 3,802,947
[45] Apr. 9, 1974

[54] EMBOSSED TRANSFER FOR USE IN THE FORMATION OF HIGH PRESSURE DECORATIVE LAMINATES HAVING REGISTERED COLOR AND EMBOSSING

[75] Inventor: John E. McQuade, Jr., Baltimore, Md.

[73] Assignee: Esso Research and Engineering Company, Linden, N.J.

[22] Filed: Mar. 27, 1972

[21] Appl. No.: 238,636

Related U.S. Application Data

[62] Division of Ser. No. 62,780, July 17, 1970, Pat. No. 3,661,672.

[52] U.S. Cl............. 161/119, 156/220, 156/232, 156/240, 156/247, 156/277, 161/116, 161/406 T, 161/DIG. 3, 161/413
[51] Int. Cl.......... B32b 3/30, B32b 3/10, B31f 1/00
[58] Field of Search ...... 161/119, 124, 413, DIG. 3, 161/406, 406 T; 156/209, 219, 220, 232, 235, 240, 247, 277, 289, 323

[56] References Cited
UNITED STATES PATENTS

| | | |
|---|---|---|
| 2,639,253 | 5/1953 | Reese.................................. 156/240 |
| 3,373,068 | 3/1968 | Grosheim et al. ................... 156/277 |
| 3,379,592 | 4/1968 | Ostrowicz........................... 156/240 |
| 3,532,587 | 10/1970 | Ungar et al. ........................ 156/219 |
| 3,616,011 | 10/1971 | Endrizzi............................. 156/247 |
| 3,674,619 | 7/1972 | Scher et al.......................... 161/119 |
| 3,687,771 | 8/1972 | Meijer................................ 156/232 |
| 3,311,520 | 3/1967 | Michaelson et al................. 156/209 |

Primary Examiner—George F. Lesmes
Assistant Examiner—Charles E. Lipsey
Attorney, Agent, or Firm—Karl W. Flocks

[57] ABSTRACT

High pressure decorative laminates having registered color and embossing are provided by temporarily laminating a sheet impregnated with an incompletely B-staged melamine resin to an embossed plate and simultaneously embossing such sheet throughout its thickness, by then printing a design on the exposed surface of the now embossed sheet in registry with the embossing thereon, and using this temporary laminate in the production of a high pressure laminate whereby the melamine resin impregnated and color coated sheet is transferred from the embossed plate during lamination.

2 Claims, 3 Drawing Figures

EMBOSSED TRANSFER FOR USE IN THE FORMATION OF HIGH PRESSURE DECORATIVE LAMINATES HAVING REGISTERED COLOR AND EMBOSSING

This is a divisional application of applicant's copending application Ser. No. 62,780, filed July 17, 1970, now U.S. Pat. No. 3,661,672.

The present invention relates to a method of producing a high pressure laminate having registered color and embossing and, more particularly, to a method of making high pressure laminates having aligned color and embossing by a transfer operation.

The production of high pressure laminates is well known and has been carried out for many years. Generally, the procedures for forming such laminates involve providing phenolic (i.e., phenol-formaldehyde) resin impregnated paper core sheets and melamine (i.e., melamine-formaldehyde) resin decorative and overlay sheets, and pressing the stacked resin impregnated sheets under heat on the order of 250–310°F and under pressure of approximately 800–1,600 psi until the resin has become thermoset, thereby providing an extremely hard, attractive and permanent surfacing material known as a "high-pressure laminate" which has, for many years, found use as table tops, desk tops, counter tops, wall paneling, etc.

In the early days of production of high pressure laminates, generally only glossy surface laminates were produced by pressing the resin-impregnated sheets between polished die plates under high pressure and temperature, although some attempts were made to provide laminates with some slight surface irregularities to give satin or textured finishes using roughened die plates or through after treatments of the laminate. In more recent years, it has become increasingly desirable to provide various types of irregular surfaces, and these range from surfaces having relatively shallow depressions, such as matte or "textured" surfaces, to relatively deeply sculptured surfaces which have a noticeable three-dimensional effect, such as wood grain, leather, slate, etc. With the rising cost of such natural products, it has become even more desirable to provide irregularly surfaced high pressure laminates which simulate these natural materials.

Thus, high pressure decorative laminates are now manufactured with smooth surfaces, with "textured" surfaces or with deeply sculptured or embossed surfaces. In the latter case, a "textured" surface may be superimposed on a sculptured or embossed surface. Today, "textured" surfaces are normally obtained by the utilization of a paper-parting sheet or a separating sheet between the laminate components and the smooth metal plate. These parting sheets, normally used but once and then thrown away, have small density variations across their surface which, during the laminating procedure, transfer their irregular cross-section to the laminate surface as it flows and cures under heat and pressure. Conventionally, the parting sheet may be Kraft paper bonded to aluminum foil having a thickness of about 0.3 mils, although many other parting sheets are used such as various papers coated and/or impregnated with various resins and plastic such as fluorocarbon resins, silicon oils or resins, sodium alginate coated papers, etc.

Where it has been desirable to provide a deeply embossed or sculptured surface having surface depth variations of as great as 0.007 inch that duplicate natural products such as slate, leather, wood and the like, it has generally been necessary to use either extremely expensive machined or etched steel plates, or, alternatively, thermoset pressing plate dies of the type described in the Jenkins U.S. Pat. No. 2,606,855 or the Michaelson et al. U.S. Pat. Nos. 3,303,081 or 3,311,520. While the use of such dies provides the necessary embossing, many simulated natural products, such as wood grain, must have appropriate color and registry with the surface embossing or debossing. Unfortunately, the problem of registration of color and embossing has proven very difficult, conventional registry techniques being unreliable on a consistent basis in the manufacture of high pressure laminates and also being extremely expensive, often involving complex electronic sensing equipment.

A particularly difficult problem presented by the registry of color and embossing in the manufacture of high pressure laminates is the fact that the color provided may not overlay the laminate, since any conventional colors which might be provided would not be sufficiently resistant to abrasion to meet N.E.M.A. standards, and in such a situation, the laminate could not properly be called a "high-pressure laminate." Accordingly, it has heretofore been necessary in providing high pressure laminates wherein the embossing and color are in registry, to separately provide the printing and the embossing and to then, prior to the lamination, align or register the separately produced items, and to maintain the registration during the laminating operation. Even where this has been successfully accomplished, the cost has been high, not only because of the complexity of the procedure, but also because of the high percentage of imperfect laminates produced thereby which must be discarded or sold as seconds.

It is, accordingly, an object of the present invention to overcome the defects of the prior art, such as indicated above.

It is another object of the present invention to produce decorative high pressure laminates, having registered color and embossing, in a simplified and inexpensive manner.

It is another object of the present invention to provide a new and improved method for inexpensively manufacturing high pressure laminates having registered color and embossing.

It is another object of the present invention to provide a transfer procedure for producing relatively low cost, high pressure decorative laminates having registered embossing and color.

In the present exemplification of this invention, there is disclosed a method by which an embossed temporary or transfer laminate is produced which is then provided with color in association with the embossed portions, and wherein the embossed and colored temporary laminate is then used in a high pressure laminating procedure wherein the previously embossed and colored element is transferred from its temporary support to form the upper surface of the high pressure laminate having registered embossing and color.

Figure 2:
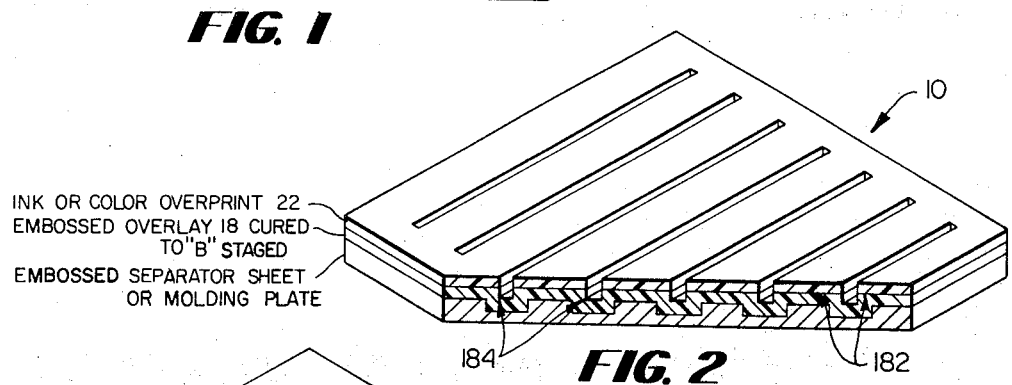
Figure 3:
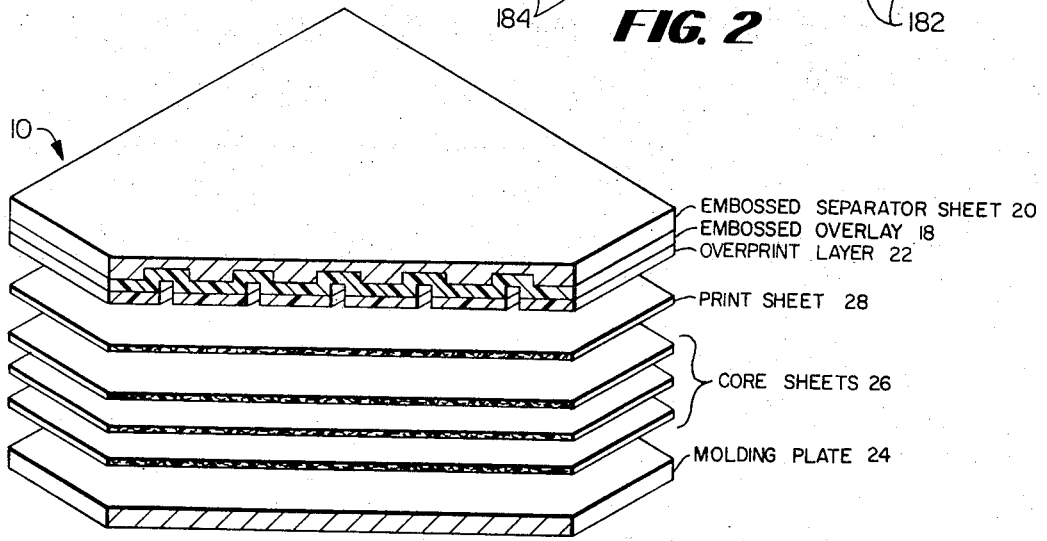

To the attainment of these ends and the accomplishment of the above as well as other new and useful objects as will appear below, the invention relates to the features of novelty in substantially the construction, combination and arrangement of the several parts hereinafter more fully described and shown in the accompanying drawing as an example illustrating this invention, and in which:

FIG. 1 schematically shows the formation of a transfer laminate in the present invention;

FIG. 2 schematically shows a temporary transfer laminate produced as shown in FIG. 1 having color applied thereto; and FIG. 3 shows utilization of the colored transfer laminate of FIG. 2 in the production of a high pressure laminate having registered color and embossing.

Briefly, the process of producing a decorative laminate, having aligned or registered embossing and color on its decorative side, employs a temporary transfer laminate of an overlay on a separator sheet which transfers embossing, overlay and color to the high pressure laminate during its production. Accordingly, in FIG. 1 there is shown schematically an operation for forming a temporary transfer laminate 10. Upon a molding plate 12 there is assembled in a stack from the bottom up, a cushion sheet 14, a release sheet 16, a melamine resin impregnated overlay sheet 18 wherein the melamine resin is cured to a state less than the B stage, and an embossed separator sheet or embossed molding plate 20.

While a molding plate of the type described in the Jenkins U.S. Pat. No. 2,606,855 or the Michaelson et al. U.S. Pat. Nos. 3,303,081 or 3,311,520 may be used, or even an expensive machined or etched steel plate, it is preferred to use a thin, embossed, impregnated separator sheet having a nonstick facing of the type disclosed in the copending application of Scher and Ungar, Ser. No. 865,894, filed Oct. 13, 1969, now U.S. Pat. No. 3,674,619, as the embossed separator sheet 20. On the other hand, unless a two-side-good transfer laminate 10 is to be made, the molding plate 12 is of conventional construction being, preferably, a steel plate having a smooth surface. The molding plate 12 serves as one of the die members in producing the temporary transfer laminate 10 of FIG. 2, while the other die member may be the molding plate 20, when a thick molding plate is used such as the type shown in the Michaelson et al. patents; however, if a thin embossed separator sheet of the type described in the Scher and Ungar application Ser. No. 865,894, is used, then a second molding plate similar to molding plate 12 will of necessity be used above the embossed separator sheet 20 to provide the other die member.

The cushion sheet 14 may be any suitable element, or a plurality thereof, for interposition between the lower molding plate 12 and the overlay element 18, the purpose of the cushion sheet 14 being to prevent the molding plate 12 from unduly flattening the overlay 18 during the laminating operation in the production of the temporary transfer laminate 10 of FIG. 2. It has been found that a simple sheet of Kraft paper, or other paper, is suitable as a cushion sheet 14 and, hence, because of its low cost, such a Kraft paper sheet is the preferred cushion sheet 14. However, any fibrous mat, or even a thin rubber sheet, could suitably serve as the cushion sheet 14.

It is necessary, in accordance with the present invention, to prevent adhesion of the cushion sheet 14 to the overlay 18 during the production of temporary transfer laminate 10. This may be accomplished by either providing a suitable non-adherent coating to the upper surface of the cushion sheet 14, by providing a cushion sheet of such structure that it is inherently non-adherent, or, preferably, by interposing a conventional release sheet 16 between the cushion sheet 14 and the overlay 18. Commercially available release sheets, also known as separator or parting sheets or membranes, include aluminum foil, silicone resin treated paper, silicone oil treated paper, "Quillon" treated paper, fluorocarbon resin treated paper, sodium alginate treated paper, etc., and any of these may be used as the release sheet 16, so long as the non-adherent surface of the release sheet 16 or the cushion sheet 14 is facing the overlay 18.

One of the critical features of the present invention resides in the nature of the overlay 18 which is assembled in the stack illustrated in FIG. 1. As indicated above, this overlay 18 is impregnated with melamine resin or other suitable resins compatible with the resin system of the ultimate laminate produced, and having the necessary properties, which resin is cured to a stage which is less than the normal "B" stage. The paper constituting the overlay 18 is preferably $\alpha$-cellulose paper since this material, as is well known, is transparent when impregnated with melamine resin and cured to the normal extent during formation of the high pressure laminate. However, whereas during normal laminating procedures the overlay sheet is impregnated with the melamine resin advanced to the B-stage of cure, in the present invention it is essential that the overlay be "green" or cured to a stage less than the B-stage.

The incompletely B-staged $\alpha$-cellulose overlay sheet is essentially an overlay sheet which has been impregnated with a water dispersion of melamine-formaldehyde resin as is conventional and wherein the volatiles have been dried at a relatively low temperature to reduce or inhibit the degree of cure which normally accompanies the drying of the overlay paper. Generally, the $\alpha$-cellulose paper will contain, per 100 pounds of such paper, about 60–70 pounds of solid melamine resin and about 10–15 pounds of volatile solvents, and the resin will have a flow* per cent of about 20–35.

* Flow % is determined by weighing an impregnated sample, pressing the sample at 1,000 psi and 300°F between sheets of aluminum foil to squeeze out flowable resin, reweighing the sample without that portion of the resin which has been squeezed out, and dividing the loss in weight of the sample by the original sample weight and multiplying by 100.

After formation of the assembly stack of FIG. 1, such stack is pressed under heat and pressure to emboss the overlay 18 throughout its thickness, thereby providing elevated and depressed portions, to advance the cure of the melamine impregnant to the B-stage and to laminate the overlay sheet 18 to the embossed plate or separator sheet 20. The pressing under heat and pressure need not be accomplished under conditions as severe as those normally used in the production of high pressure laminates; thus, the pressing may be carried out at about 400–600 psi and at about 200°F for about 5–15 minutes. Higher temperatures may be used in which case the time will be shorter, or lower temperatures may be used in which case a greater time period will be necessary. One satisfactory time-temperature profile comprises heating up to 222°F during the first 5 minutes, pressing at 222°F for the next 3 minutes, cooling to 150°F for the next 4 minutes, cooling from 150°–100°F for the next 4 minutes, and finally removing the temporary transfer laminate 10 from the press at the 18th minute.

The sub-B-staged overlay 18 may be applied to the embossed separator 20 by a heated platen press or, preferably, it may be applied continuously by heated pressure roll techniques.

After removal of the plate 10 from the press, the release sheet 16 and the cushion sheet 14 are stripped from the face of the embossed overlay 18 which has now been cured to the B-stage. As will be seen from FIG. 2, the embossed overlay 18 is then provided with elevated portions 182 and with depressed portions 184 on its exposed surface.

The next step in the operation comprises merely applying a suitable color or ink design 22 on the exposed surface of the embossed overlay 18 as shown in FIG. 2. The ink or color may be printed on the overlay 18 so as to fill the depressions 184 or it may be printed only on the elevated portions 182 as is illustrated in FIG. 2. At any rate, it will be evident that the coloring or ink is applied in a very simple manner directly onto the overlay coated embossed separator sheet or transfer laminate 10 in exact registration with the embossed pattern, for example by an inking roller. The printing may be accomplished by any other known manner, e.g., the silk screen method, valley printing, gravure, etc. Conventional inks and color, normally used to give color to print sheets used in the formation of high pressure laminates, may be used to provide the overprint color layer 22. After application of the ink or color overprint 22 and drying thereof, the temporary transfer laminate 10 will have the appearance shown in FIG. 2.

As can best be seen in FIG. 2, the temporary transfer laminate 10 comprises a temporary support 20 having a variable thickness, a smooth backing and an embossed front, and the support 20 is provided with a release surface on its embossed front. Above the support 20 is an embossed, melamine resin impregnated porous sheet 18, temporarily laminated to the release surface of the support 20, the sheet 18 being of generally uniform thickness, but conforming to the embossed surface characteristics of the support 20. A color coating 22 is provided on the exposed surface of the resin impregnated sheet 18, the color coating being discontinuous and conforming to the embossing. The color coating 22 is compatible with the melamine resin impregnant.

The temporary transfer laminate 10 is then ready for use in a high pressure laminating procedure to produce the high pressure laminate having registered color and embossing. This is accomplished by providing an assembly as shown in FIG. 3 comprising, from the bottom up, a molding plate 24, a plurality of phenolic or other suitable resin impregnated core sheet 26, a conventional colored print sheet 28 and the temporary transfer laminate 10. As indicated above, the core sheets and the print sheet are of conventional construction being, preferably, phenolic resin impregnated paper sheets and a colored melamine resin impregnated α-cellulose sheet, respectively.

The assembly in FIG. 3 is then pressed under normal conditions of high heat and pressure to form a high pressure laminate. As indicated above, these conditions are normally on the order of 800–1,600 psi and on the order of 250°–310°F.

After the assembly has been cured and the high pressure laminate formed, the embossed separator sheet 20 is then stripped from the upper surface of the resultant high pressure laminate, the embossed overlay 18 having been laminated to the print sheet 28 with the color layer 22 trapped therebetween. It will be seen that portions of the resultant laminate will be provided with color from the overprint layer 22 which is now protected by the embossed overlay 18 while other portions will be provided with color provided by the print sheet 28, also protected by the overlay 18. It will also be seen that there is exact registry between the embossing and the different colors.

The importance of using a sub-B-staged overlay 18 during the first laminating procedure to produce the temporary transfer laminate 10 of FIG. 2 will now be more readily understood. Thus, if a normally B-staged melamine resin impregnated overlay is used in the first laminating procedure, the cure during such first lamination will proceed so far that during the second laminating procedure, during which the transfer 10 is used, the cure will be advanced even further and so the ultimate product will be unsatisfactory because the embossed overlay will have been overcured. In other words, the advantage of the green overlay is that it can tolerate what amounts to double press exposure and still develop normal adhesion to the print sheet 28 during the second laminating operation.

Some advantages of the present invention are that the transfer laminate 10 is handled as a single unit capable of simultaneously embossing and coloring a high pressure laminate with registry. No chance exists for the embossing medium and the color medium to shift out of registry during production, handling and processing, thereby giving a new result which has not been possible with past attempts to manufacture registered embossed high pressure laminates. Furthermore, the color is maintained under the overlay where it is completely protected from wear and abrasion, the registered embossed laminate meeting N.E.M.A. heat resistance and blistering standards since by starting with sub-B-staged overlay, sufficient resin flow is retained so that normal adhesion of the overlay to the print sheet is developed in the final laminate pressing cycle.

The possibilities for producing registered three-dimensional laminates by the present method are many and varied, limited only by imagination. Decorative patterns of intricate design or simple shapes registered with one or more colors with different textures may be produced in relief or in intaglio. Wood grain patterns may be embellished with three-dimensional ticking to give the feel and appearance of natural wood. Laminates may be produced displaying messages where the characters are raised (embossed) or lowered (debossed) and of different colors and textures surrounding such characters. Additionally, while the exemplified embodiment shows the production of a one-side-good laminate, it will be understood that two-side-good laminates can also be made by the present operation.

To more fully describe the invention, specific examples, offered for illustration but not limitation, are provided:

EXAMPLE 1

Step 1: Production of Sub-B-Staged Overlay Sheet 18 (Green Overlay)

Conventional α-cellulose impregnating paper having a basis weight of 29–31 pounds is saturated with melamine-formaldehyde resin solution in a conventional manner. The resin comprises 45–55 percent solids and contains 0.1–1.0 percent chloroacetamide as a latent catalyst. This latent catalyst has an activating temperature of approximately 240°F. After impregnating the α-cellulose paper, the paper is passed to a three-zoned convection oven where it is dried of resin solution volatiles. The oven is operated at temperatures significantly below the catalyst activation temperature but sufficient to reduce the resin solution volatiles so the impregnated paper is dry to the touch after passage through the oven. In the present situation in production of the green overlay, the oven length was 67 feet, the paper speed was 52 feet per minute, and the time of the paper in the oven was 1.29 minutes. The oven temperature conditions were as follows:

Zone 1   170°F
Zone 2   190°F
Zone 3   200°F

The green overlay, after removal from the oven, had a resin pickup of 64–69 percent, a volatility of 12–15 percent and a flow of 20–35 percent.

Step 2: Formation of Temporary Transfer Laminate 10

The assembly of FIG. 1, using a separator sheet 20 of the Scher and Ungar type of Ser. No. 865,894, was pressed in a heated platen press at a platen temperature of 225°F at 500 psi under the following time-temperature profile:

| Time (Minutes) | Temperature (Degrees F.) | |
|---|---|---|
| 0–5 | 85–222° | |
| 5–8 | 222° | |
| 8–12 | 222–150° | (cooling begun at 8 min.) |
| 12–18 | 150–100° | |

The press was opened after 18 minutes and the overlay faced separator 10 (but without the color overprint 22) was removed. This procedure provides the overlay temporarily adhered to and formed to the exact shape of the embossed separator sheet 20. The resin contained in the overlay at this point is at or very near the normal B-stage as measured by flow determination (7–14 percent).

Step 3: Printing Overlay Faced Embossed Separator 10

The embossed overlay faced separator 10 is placed with its overlay side up, and a silk screen capable of printing the exact pattern of the embossing superimposed over the embossing in exact registry therewith is placed thereover. The pattern 22 is printed onto the embossed overlay coated separator using a conventional laminating ink normally used in the printing of print sheets such as print sheet 28. The resultant colored temporary transfer laminate 10 is shown in FIG. 2.

Step 4: Utilization of the Temporary Laminate 10 to Produce Registered Three-Dimensional Laminate An assembly such as shown in FIG. 3 is provided using the temporary laminate 10, a conventional melamine resin-impregnated α-cellulose print sheet 28 and conventional phenolic impregnated core sheets 26. The composite is pressed in a normal manner with typical molding cycle being 1,000 psi, 300°F for 30 minutes, with cooling under pressure and utilizing a total cycle time of about 60 minutes. The separator 20 embosses the laminate with the printed overlay sheet 18 releasing therefrom during this final curing step and becoming the top ply of the completed laminate. The resultant laminate fully meets N.E.M.A. standards, and yet there is perfect registration of color and embossing.

EXAMPLE 2

The same operation as described above in Example 1 was repeated except that the ink overprint 22 was applied to the temporary transfer laminate 10 by merely using an ink rubber roller. As with the preceding example, the results were excellent with no variation in the registry of the texture and the coloring.

The foregoing description of a specific embodiment will so fully reveal the general nature of the invention that others can, by applying current knowledge, readily modify such specific embodiment and/or adapt it for various applications without departing from the generic concept, and, therefore, such adaptations and modifications should and are intended to be comprehended within the meaning and range of equivalents of the disclosed embodiment. It is to be understood that the phraseology or terminology employed herein is for the purpose of description and not of limitation.

What is claimed is:

1. An embossed transfer for use in the manufacture of embossed high pressure laminates by providing an assembly of
    1. said embossed transfer comprising an embossed plate and a printed overlay thereon,
    2. a resin impregnated print layer facing said printed overlay, and
    3. a plurality of resin impregnated core layers,
said embossed transfer consisting essentially of:
    a support plate having a smooth backing and an embossed front and formed of a material resistant to high temperature and pressure;
    a release surface on the embossed front of said support plate;
    an embossed, melamine-aldehyde resin impregnated porous sheet temporarily laminated to the release surface of said support plate, said sheet being of generally uniform thickness and conforming to the embossed surface characteristics of said support plate, said melamine-aldehyde resin being cured to the B-stage, and said melamine-aldehyde resin-impregnated porous sheet being transparent when cured to the normal extent during formation of the high pressure laminate; and
    a color coating on the exposed surface of said resin impregnated sheet, said color coating being discontinuous and in exact registration with the embossed pattern on said exposed surface, said color coating being compatible with said melamine-aldehyde resin impregnant and resistant to high temperature and pressure.

2. An embossed transfer in accordance with claim 1 wherein said color coating covers the elevated portions of said resin impregnated sheet.

* * * * *